US010066590B2

(12) United States Patent
Johnson et al.

(10) Patent No.: US 10,066,590 B2
(45) Date of Patent: *Sep. 4, 2018

(54) OPPOSED PISTON THREE NOZZLE COMBUSTION CHAMBER DESIGN

(71) Applicant: AVL Powertrain Engineering, Inc., Plymouth, MI (US)

(72) Inventors: Gustav R. Johnson, Canton, MI (US); Gary L. Hunter, Brighton, MI (US)

(73) Assignee: AVL POWERTRAIN ENGINEERING, INC., Plymouth, MI (US)

( * ) Notice: Subject to any disclaimer, the term of this patent is extended or adjusted under 35 U.S.C. 154(b) by 218 days.

This patent is subject to a terminal disclaimer.

(21) Appl. No.: 15/050,878

(22) Filed: Feb. 23, 2016

(65) Prior Publication Data

US 2016/0252065 A1 Sep. 1, 2016

Related U.S. Application Data

(60) Provisional application No. 62/126,009, filed on Feb. 27, 2015, provisional application No. 62/121,879, (Continued)

(51) Int. Cl.
F02B 43/00 (2006.01)
F02M 61/14 (2006.01)
(Continued)

(52) U.S. Cl.
CPC ............. *F02M 61/14* (2013.01); *F01B 7/02* (2013.01); *F02B 23/066* (2013.01); *F02B 25/08* (2013.01); *F02B 75/28* (2013.01); *Y02T 10/125* (2013.01)

(58) Field of Classification Search
CPC ....... F02M 61/14; F02B 23/066; F02B 25/08; F02B 75/28; F01M 7/02; Y02T 10/125
(Continued)

(56) References Cited

U.S. PATENT DOCUMENTS 1,127,772 A * 2/1915 Junkers .......................... 123/299
1,143,408 A * 6/1915 Kramer ......................... 123/298
(Continued)

FOREIGN PATENT DOCUMENTS

CN 102588075 7/2012
CN 102588075 A 7/2012
(Continued)

OTHER PUBLICATIONS

Extended European Search Report for Application No. 16157545.1 dated Jul. 21, 2016.
(Continued)

*Primary Examiner* — Marguerite McMahon
(74) *Attorney, Agent, or Firm* — Harness, Dickey & Pierce, P.L.C.

(57) ABSTRACT

An opposed piston engine may include a first housing, first and second pistons, and first, second, and third fuel injector nozzles. The first housing may define a first passage extending along a first longitudinal axis. The first and second pistons may be slidably disposed within the first passage. The first, second, and third fuel injector nozzles may be in fluid communication with the first passage. At least one of the first, second, and third fuel injector nozzles may be angularly offset from another one of the first, second, and third fuel injector nozzles by an oblique angle about the first longitudinal axis.

27 Claims, 4 Drawing Sheets

Related U.S. Application Data filed on Feb. 27, 2015, provisional application No. 62/121,815, filed on Feb. 27, 2015, provisional application No. 62/121,788, filed on Feb. 27, 2015.

(51) Int. Cl.
  *F02B 23/06* (2006.01)
  *F02B 25/08* (2006.01)
  *F01B 7/02* (2006.01)
  *F02B 75/28* (2006.01)

(58) Field of Classification Search
  USPC .......................................... 123/51 R–51 BC
  See application file for complete search history.

(56) References Cited

U.S. PATENT DOCUMENTS

| | | | |
|---|---|---|---|
| 1,486,583 | A | 3/1924 | Huskisson |
| 2,463,418 | A | 3/1949 | Pescara |
| 3,007,462 | A * | 11/1961 | Balzer ................. F02B 75/26 123/51 B |
| 3,407,790 | A | 10/1968 | Antonsen |
| 3,777,977 | A | 12/1973 | Regneault et al. |
| 3,997,117 | A | 12/1976 | Kohler et al. |
| 4,043,301 | A | 8/1977 | Rheingold |
| 4,872,433 | A * | 10/1989 | Paul ..................... F02B 23/02 123/257 |
| 5,042,441 | A * | 8/1991 | Paul ..................... F01B 7/14 123/257 |
| 6,170,443 | B1 | 1/2001 | Hofbauer |
| 7,334,570 | B2 | 2/2008 | Klyza |
| 8,677,950 | B2 | 3/2014 | Hofbauer |
| 8,689,768 | B2 | 4/2014 | Saruwatari |
| 8,783,218 | B2 * | 7/2014 | Shen ................. F02B 23/0675 123/51 R |
| 8,800,528 | B2 | 8/2014 | Fuqua et al. |
| 8,820,294 | B2 * | 9/2014 | Fuqua ..................... F01B 7/02 123/299 |
| 8,997,710 | B2 | 4/2015 | Herold et al. |
| 9,211,797 | B2 | 12/2015 | Abani et al. |
| 2002/0109014 | A1 | 8/2002 | Augustin |
| 2003/0101967 | A1 | 6/2003 | Forck et al. |
| 2004/0139932 | A1 * | 7/2004 | Palmer ................. F01B 3/045 123/41.1 |
| 2006/0157003 | A1 | 7/2006 | Lemke et al. |
| 2010/0252010 | A1 | 10/2010 | Phillips |
| 2012/0080007 | A1 | 4/2012 | Herold et al. |
| 2012/0192831 | A1 | 8/2012 | Tusinean |
| 2012/0285418 | A1 * | 11/2012 | Elsbett ..................... F01B 7/14 123/300 |
| 2013/0014718 | A1 † | 1/2013 | Shen |
| 2013/0025556 | A1 | 1/2013 | Hofbauer |
| 2013/0036999 | A1 | 2/2013 | Levy et al. |
| 2013/0104848 | A1 † | 5/2013 | Klyza |
| 2013/0146021 | A1 | 6/2013 | Hofbauer et al. |
| 2013/0152547 | A1 | 6/2013 | Hofbauer |
| 2013/0213342 | A1 | 8/2013 | Burton et al. |
| 2013/0276762 | A1 | 10/2013 | Hofbauer |
| 2014/0014063 | A1 | 1/2014 | Redon |
| 2014/0026840 | A1 | 1/2014 | Okada et al. |
| 2015/0013649 | A1 | 1/2015 | Fuqua et al. |
| 2015/0285127 | A1 * | 10/2015 | Abani ................. F02B 23/0663 123/299 |
| 2015/0377169 | A1 | 12/2015 | Takeda |
| 2016/0032823 | A1 * | 2/2016 | McClearen ............. F02B 75/28 123/51 B |
| 2016/0032859 | A1 | 2/2016 | Klingbeil et al. |
| 2016/0195028 | A1 * | 7/2016 | Redon ................. F02D 41/0025 123/299 |
| 2016/0252067 | A1 * | 9/2016 | Johnson ..................... F02F 3/24 123/51 R |

FOREIGN PATENT DOCUMENTS

| | | |
|---|---|---|
| DE | 102007056913 A1 | 5/2009 |
| EP | 0196265 A2 | 10/1986 |
| EP | 0836003 A1 | 4/1998 |
| EP | 2672101 A1 | 12/2013 |
| EP | 2837802 A1 | 2/2015 |
| FR | 2145081 A5 | 2/1973 |
| GB | 1014831 A | 12/1965 |
| GB | 2019487 | 10/1979 |
| GB | 2019487 A | 10/1979 |
| GB | 2491155 | 11/2012 |
| GB | 2491155 A | 11/2012 |
| GB | 2493260 | 1/2013 |
| GB | 2493260 A | 1/2013 |
| GB | 2530761 A | 4/2016 |
| GB | 2515254 B | 7/2016 |
| JP | 2009-103085 A | 5/2009 |
| JP | 4576884 B2 | 11/2010 |
| WO | WO-2001025618 A1 | 4/2001 |
| WO | 2011061191 | 5/2011 |
| WO | 2011061191 A1 | 5/2011 |
| WO | WO-2012143075 A1 | 10/2012 |
| WO | 2012158756 | 11/2012 |
| WO | 2012158756 A1 | 11/2012 |
| WO | WO-2014000946 A1 | 1/2014 |
| WO | WO-2014030319 A1 | 2/2014 |
| WO | WO-2014096956 A1 | 6/2014 |
| WO | 2014162143 A1 | 10/2014 |

OTHER PUBLICATIONS

Extended European Search Report for Application No. 16157539.4 dated Jul. 19, 2016.
CRIN2 HD—Component Description. [Retrieved on Jan. 28, 2015] Retrieved from the Internet. <URL: http://www.nantai-china.com/english/contentfile/20111222114949339.jpg>.
Extended European Search Report for Application No. 16157549.3 dated May 23, 2016.
Parche, Dr. Marcus. Diesel Engine-Efficieny and Emissions Research Conference Aug. 20-24, 2006. [Retrieved on May 25, 2016] Retrieved from the Internet. <URL: http://energy.gov/sites/prod/files/2014/03/f9/2006_deer_parche.pdf.> p. 15.
U.S. Appl. No. 15/050,792, filed Feb. 23, 2016, Gustav R. Johnson.
U.S. Appl. No. 15/050,883, filed Feb. 23, 2016, Gustav R. Johnson, et al.
U.S. Appl. No. 15/050,945, filed Feb. 23, 2016, Gustav R. Johnson, et al.
Jean-Pierre Pirault et al., "Opposed Piston Engines: Evolution, Use, and Future Applications", SAE International, Warrendale, PA, 2010, pp. 371-375.†
Nicholas R. Hirsch et al, "Advanced Opposed-piston Two-stroke Diesel Demonstrator", SAE Technical Paper Series 2006-01-0926, 2006 World Congress, Apr. 3-6, 2006, Detroit, MI.†

\* cited by examiner
† cited by third party

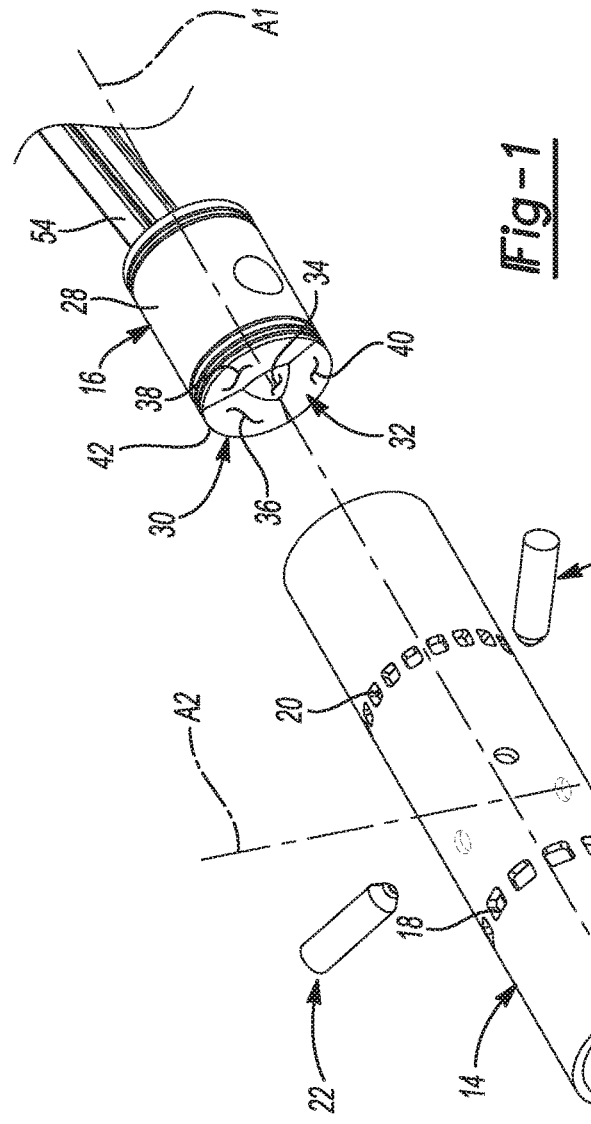
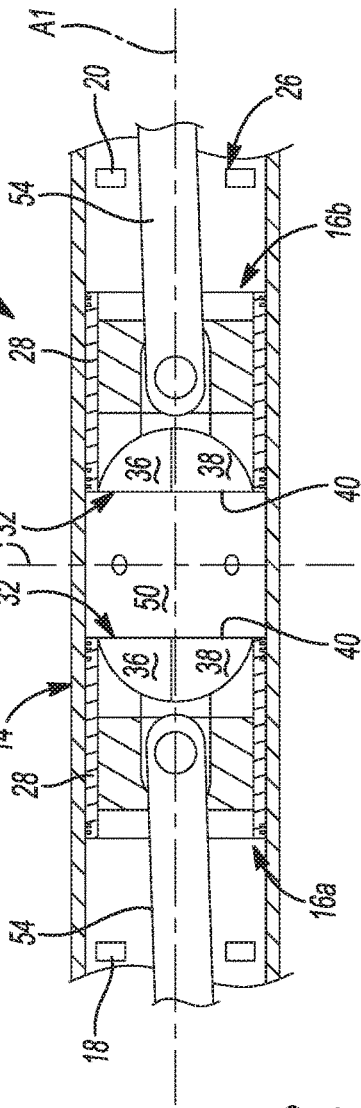
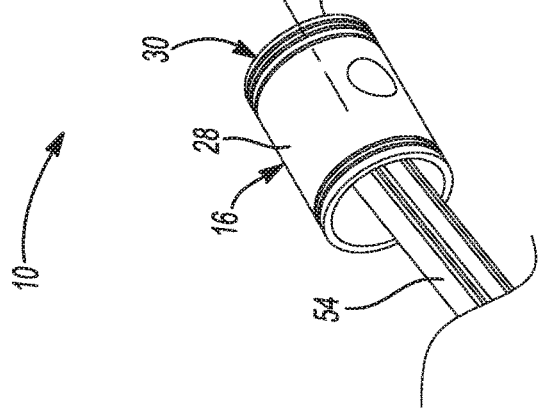
Fig-1
Fig-2

OPPOSED PISTON THREE NOZZLE COMBUSTION CHAMBER DESIGN

CROSS-REFERENCE TO RELATED APPLICATIONS

This application claims the benefit of U.S. Provisional Application No. 62/126,009, filed on Feb. 27, 2015, U.S. Provisional Application No. 62/121,788, filed on Feb. 27, 2015, U.S. Provisional Application No. 62/121,815, filed on Feb. 27, 2015, and U.S. Provisional Application No. 62/121,879, filed on Feb. 27, 2015. Furthermore, this application is related to U.S. patent application Ser. No. 15/050,792, filed Feb. 23, 2016, U.S. patent application Ser. No. 15/050,883, filed Feb. 23, 2016, and U.S. patent application Ser. No. 15/050,945, filed Feb. 23, 2016. The entire disclosures of the applications referenced above are incorporated herein by reference.

FIELD

The present disclosure relates to opposed piston engines, and more particularly to opposed piston engines including a combustion chamber having three nozzles.

BACKGROUND

This section provides background information related to the present disclosure and is not necessarily prior art.

Opposed piston engines include two pistons housed within a single cylinder that move in an opposed, reciprocal manner within the cylinder. In this regard, during one stage of operation, the two pistons are moving away from one another within the cylinder. During another stage of operation, the two pistons are moving towards one another within the cylinder.

Nozzles or injection ports can be used to inject a fuel into the cylinder. As the pistons move towards one another within the cylinder, they compress and, thus, cause the ignition of a fuel injected into the cylinder by the nozzle. In some configurations, each cylinder can include more than one fuel nozzle. In addition, each opposed piston engine can include more than one cylinder. In such configurations, the arrangement of the fuel nozzles and the cylinders can add to the overall size, weight, and complexity of the opposed piston engine.

While known opposed-piston engines have generally proven to be acceptable for their intended purposes, a continued need in the relevant art remains for an opposed piston engine having improved combustion performance, including efficient air utilization and fuel mixing, and a reduced size, weight, and complexity.

SUMMARY

This section provides a general summary of the disclosure, and is not a comprehensive disclosure of its full scope or all of its features.

The present disclosure provides an opposed piston engine that includes a first housing and first, second, and third fuel injector nozzles. The first housing defines a first passage extending along a first longitudinal axis. The first, second, and third fuel injector nozzles have first, second, and third nozzle axes, respectively. The first, second, and third nozzle axes are disposed in a common plane that is perpendicular to the first longitudinal axis. At least one of the first, second, and third nozzle axes is angularly offset relative to another one of the first, second, and third nozzle axes by an oblique angle about the first longitudinal axis. The first, second, and third fuel injector nozzles are in fluid communication with the first passage.

In some configurations, the opposed piston engine further includes a second housing and fourth, fifth, and sixth fuel injector nozzles. The second housing defines a second passage extending along a second longitudinal axis that is substantially parallel to the first longitudinal axis. The fourth, fifth, and sixth fuel injector nozzles have fourth, fifth, and sixth nozzle axes, respectively. The fourth, fifth, and sixth nozzle axes are disposed in a second common plane that is perpendicular to the second longitudinal axis. At least one of the fourth, fifth, and sixth nozzle axes is angularly offset relative to another one of the fourth, fifth, and sixth nozzle axes by an oblique angle about the second longitudinal axis. The fourth, fifth, and sixth fuel injector nozzles are in fluid communication with the second passage. The orientation of the fourth fuel injector nozzle about the second longitudinal axis is angularly aligned with the orientation of the first fuel injector nozzle about the first longitudinal axis.

In some configurations, the opposed piston engine further includes a third housing and seventh, eighth, and ninth fuel injector nozzles. The third housing defines a third passage extending along a third longitudinal axis that is substantially parallel to the first and second longitudinal axes. The third housing is disposed between the first and second housings. The seventh, eighth, and ninth fuel injector nozzles are circumferentially disposed about the third longitudinal axis and are in fluid communication with the third passage. The orientation of the seventh fuel injector nozzle about the third longitudinal axis is angularly offset by a first angle relative to the orientation of the first fuel injector nozzle about the first longitudinal axis and relative to the orientation of the fourth fuel injector nozzle about the second longitudinal axis.

In some configurations, the third longitudinal axis is offset from the first and second longitudinal axes by a distance extending in a direction substantially perpendicular to the first and second longitudinal axis.

In some configurations, the first and third longitudinal axes define a third common plane.

In some configurations, the first, second, and third nozzle axes are symmetrically disposed about the first longitudinal axis.

In some configurations, the first nozzle axis is angularly offset relative to the second nozzle axis by a first angle about the first longitudinal axis, the second nozzle axis is angularly offset relative to the third nozzle axis by a second angle about the first longitudinal axis, the third nozzle axis is angularly offset relative to the first nozzle axis by a third angle about the first longitudinal axis, and the first and third angles are equal to one another and are greater than the second angle.

In some configurations, the opposed piston engine further includes a first housing defining a first passage extending along a first longitudinal axis, a first pair of pistons slidably disposed within the first passage, first, second, and third fuel injector nozzles circumferentially disposed about the first longitudinal axis and in fluid communication with the first passage, a second housing defining a second passage extending along a second longitudinal axis substantially parallel to the first longitudinal axis, a second pair of pistons slidably disposed within the second passage, and fourth, fifth, and sixth fuel injector nozzles circumferentially disposed about the second longitudinal axis and in fluid communication with the second passage. The orientation of the fourth fuel injector nozzle about the second longitudinal axis is angularly offset relative to the orientation of the first fuel injector nozzle about the first longitudinal axis. The orientation of the fifth fuel injector nozzle about the second longitudinal axis is angularly offset relative to the orientation of the second fuel injector nozzle about the first longitudinal axis.

In some configurations, the second longitudinal axis is offset from the first longitudinal axis by a first distance extending in a first direction substantially perpendicular to the first longitudinal axis.

In some configurations, the opposed piston engine further includes a third housing defining a third passage extending along a third longitudinal axis. The third longitudinal axis is substantially parallel to the first and second longitudinal axes. The third longitudinal axis is offset from the second longitudinal axis by a second distance extending in a second direction substantially perpendicular to the second longitudinal axis.

In some configurations, the first and third longitudinal axes define a first plane.

In some configurations, the opposed piston engine further includes a fourth housing defining a fourth passage extending along a fourth longitudinal axis. The fourth longitudinal axis is substantially parallel to the first, second, and third longitudinal axes. The fourth longitudinal axis is offset from the third longitudinal axis by a third distance extending in a third direction substantially perpendicular to the third longitudinal axis.

In some configurations, the second and fourth longitudinal axes define a second plane.

In some configurations, the first, second, and third fuel injector nozzles are disposed within a common plane that is perpendicular to the first longitudinal axis, and the fourth, fifth, and sixth fuel injector nozzles are disposed within a common plane that is perpendicular to the second longitudinal axis.

In some configurations, the first, second, and third fuel injector nozzles are symmetrically disposed about the first longitudinal axis, and the fourth, fifth, and sixth fuel injector nozzles are symmetrically disposed about the second longitudinal axis.

In some configurations, the first fuel injector nozzle is angularly offset relative to the second fuel injector nozzle by a first angle about the first longitudinal axis, the second injector nozzle is angularly offset relative to the third injector nozzle by a second angle about the first longitudinal axis, the third injector nozzle is angularly offset relative to the first injector nozzle by a third angle about the first longitudinal axis, the fourth fuel injector nozzle is angularly offset relative to the fifth fuel injector nozzle by the first angle about the second longitudinal axis, the fifth fuel injector nozzle is angularly offset relative to the sixth fuel injector nozzle by the second angle about the second longitudinal axis, the sixth fuel injector nozzle is angularly offset relative to the fourth fuel injector nozzle by the third angle about the second longitudinal axis, and the first and third angles are equal to one another and are greater than the second angle.

The present application also provides an opposed piston engine including a first housing defining a first passage extending along a first longitudinal axis, first, second, and third fuel injector nozzles circumferentially disposed about the first longitudinal axis and in fluid communication with the first passage, a second housing defining a second passage extending along a second longitudinal axis substantially parallel to the first longitudinal axis, and fourth, fifth, and sixth fuel injector nozzles circumferentially disposed about the second longitudinal axis and in fluid communication with the second passage. The orientation of the fourth fuel injector nozzle about the second longitudinal axis is angularly offset relative to the orientation of the first fuel injector nozzle about the first longitudinal axis.

In some configurations, the orientation of the fourth fuel injector nozzle about the second longitudinal axis is angularly offset relative to the orientation of the first fuel injector nozzle about the first longitudinal axis by an angle that is between 45 degrees and 75 degrees and/or substantially equal to 60 degrees.

In some configurations, the second longitudinal axis is offset from the first longitudinal axis by a distance extending in a direction substantially perpendicular to the first longitudinal axis.

In some configurations, the opposed piston engine further includes a third housing defining a third passage extending along a third longitudinal axis. The third longitudinal axis is substantially parallel to the first and second longitudinal axes. The third longitudinal axis is offset from the second longitudinal axis by a distance extending in a direction substantially perpendicular to the second longitudinal axis.

In some configurations, the first and third longitudinal axes define a first plane.

In some configurations, the opposed piston engine further includes a pair of first and second pistons slidably disposed within the first passage of the first housing. Each of the first and second pistons has a crown and a skirt that are at least partially made of metal.

In some configurations, each of the first and second pistons is coated with a ceramic material.

In some configurations, each of the first and second pistons includes a thermal cap that is made of a ceramic material and that defines the crown.

In some configurations, the first, second, and third fuel injector nozzles are symmetrically disposed about the first longitudinal axis, and the fourth, fifth, and sixth fuel injector nozzles are symmetrically disposed about the second longitudinal axis.

In some configurations, the first fuel injector nozzle is angularly offset relative to the second fuel injector nozzle by a first angle about the first longitudinal axis, the second injector nozzle is angularly offset relative to the third injector nozzle by a second angle about the first longitudinal axis, the third injector nozzle is angularly offset relative to the first injector nozzle by a third angle about the first longitudinal axis, the fourth fuel injector nozzle is angularly offset relative to the fifth fuel injector nozzle by the first angle about the second longitudinal axis, the fifth fuel injector nozzle is angularly offset relative to the sixth fuel injector nozzle by the second angle about the second longitudinal axis, the sixth fuel injector nozzle is angularly offset relative to the fourth fuel injector nozzle by the third angle about the second longitudinal axis, and the first and third angles are equal to one another and are greater than the second angle.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is an exploded view of an opposed piston engine in accordance with the principles of the present disclosure;

FIG. 2 is a cross-sectional view of the opposed-piston engine of FIG. 1;

Corresponding reference numerals indicate corresponding parts throughout the several views of the drawings.

DETAILED DESCRIPTION

Example embodiments will now be described more fully with reference to the accompanying drawings.

With reference to FIGS. 1-3, an engine 10 is provided. In one configuration, the engine 10 may be an opposed-piston, two-stroke diesel engine for use in a vehicle or other machine. It will be appreciated, however, that the engine 10 may have other configurations such as a spark-ignition engine or a free-piston engine within the scope of the present disclosure.

Figure 3A:
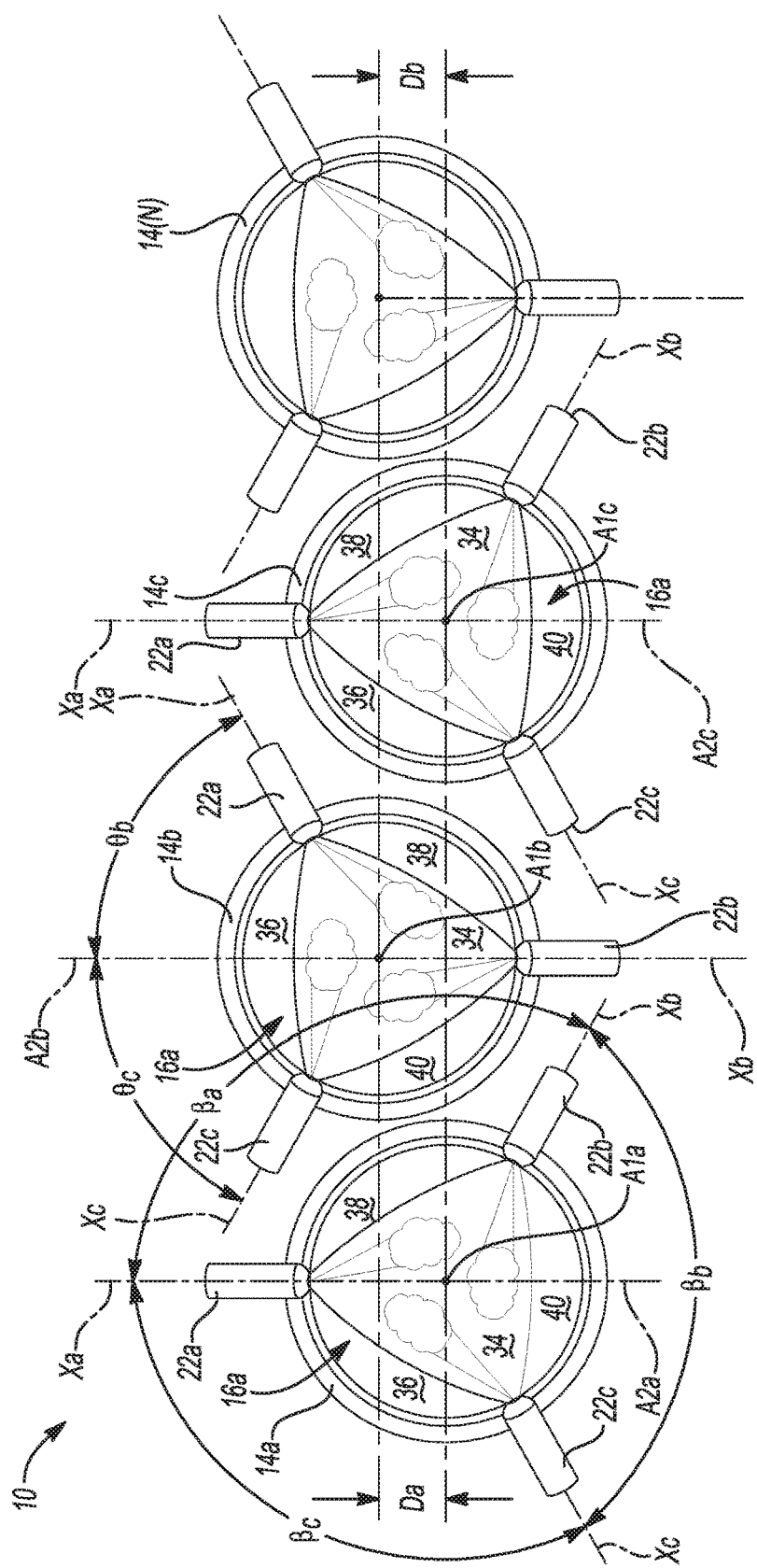
FIG. 3A is another cross-sectional view of the opposed-piston engine of FIG. 1.

The engine 10 may include a housing or cylinder 14, one or more piston 16, an outlet 18, an inlet 20, and at least one fuel injector or nozzle 22. With reference to FIG. 3A, while four cylinders 14 are shown, it will be appreciated that the engine 10 may include any number of cylinders 14, each including at least one piston 16, as is known in the art. As illustrated in FIG. 1, in one configuration, the engine 10 may include two pistons 16.

The cylinder 14 may be formed from a material such as iron, steel, or a suitable metallic alloy, and may extend along a longitudinal axis A1. In this regard, the longitudinal axis A1 may be a central longitudinal axis A1, such that the cylinder 14 is symmetrically disposed about the longitudinal axis A1. The cylinder 14 may also include a transverse axis A2 extending in a direction substantially perpendicular to the longitudinal axis A1. A bore or passage 26 may extend through, or otherwise be defined by, the cylinder 14 along the longitudinal axis A1. The outlet 18 and the inlet 20 may be configured to fluidly communicate with the passage 26. In this regard, the inlet 20 can be configured to deliver air (e.g., ambient air, air from a turbocharger or other portion of an exhaust gas regeneration system (not shown), etc.) to the passage 26 for combustion, while the outlet 18 can be configured to remove exhaust gases from the passage 26 after combustion.

The pistons 16 may be slidably disposed in the passage 26 of the cylinder 14 for opposed, reciprocating motion along the longitudinal axis A1. Each piston 16 may include a skirt 28 and a crown 30. In some configurations, the skirt 28 can be integrally or monolithically formed with the crown 30. The crown 30 may include a recess 32 that is at least partially formed or defined by a bottom surface 34, first side surface 36, a second side surface 38, and a third side surface 40. In some configurations, the bottom surface 34 may be concave and symmetrically disposed about the longitudinal axis A1. The first, second, and third side surfaces 36, 38, 40 may be substantially identical to each other. In this regard, the first, second, and third side surfaces 36, 38, 40 may extend from an end or rim 42 of the piston 16 to the bottom surface 34. Accordingly, the first, second, and third side surfaces 36, 38, 40 may be symmetrically disposed about the longitudinal axis A1. In some configurations, the first, second, and third side surfaces 36, 38, 40 may include a concave shape or profile. It will be appreciated, however, that the first, second, and third side surfaces 36, 38, 40 may include various shapes or profiles within the scope of the present disclosure.

As illustrated in FIG. 2, in an assembled configuration, the recess 32 of a first piston 16a and the recess 32 of a second piston 16b may define a chamber 50 therebetween. The first and second pistons 16a, 16b may be disposed within the passage 26 such that the first, second, and third side surfaces 36, 38, 40 of the first piston 16a are aligned with the first, second, and third side surfaces 36, 38, 40, respectively, of the second piston 16b. Accordingly, in some configurations the chamber 50 may be symmetrically disposed relative to the longitudinal axis A1. Specifically, the chamber 50 may be symmetric relative to a cross section of the engine 10 intersecting the longitudinal axis A2 (FIG. 2), and symmetric relative to a cross section of the engine 10 intersecting the transverse axis A1 (FIG. 2). In other configurations, the first, second, and third side surfaces 36, 38, 40 of the first piston 16a may be offset from, or otherwise have a different shape or profile than the first, second, and third side surfaces 36, 38, 40 of the second piston 16b, such that the chamber 50 may be asymmetric relative to the cross section of the engine 10 intersecting the longitudinal axis A1 (FIG. 2), and/or asymmetric relative to the cross section of the engine 10 intersecting the transverse axis A2 (FIG. 2).

As illustrated in FIG. 3A, the first piston 16a of a first cylinder 14a may be angularly offset relative to the orientation of the first piston 16a of a second cylinder 14b. Similarly, the first piston 16a of a third cylinder 14c may be angularly offset relative to the orientation of the first piston 16a of the second cylinder 14b. In this regard, the first piston 16a of the second cylinder 14b may be rotated by a first angle about the longitudinal axis A1b relative to the orientation of the first piston 16a of the first cylinder 14a about the longitudinal axis A1a, and the first piston 16a of the third cylinder 14c may be rotated by a second angle about the longitudinal axis A1c relative to the orientation of the first piston 16a of the second cylinder 14b about the longitudinal axis A1b. In some configurations, the first angle may be substantially equal to the second angle, such that the first piston 16a of the first cylinder 14a is substantially angularly aligned with the first piston 16a of the third cylinder 14c relative to, or about, the longitudinal axes A1a and A1c. It will be appreciated that the second pistons 16b of the first, second, and third cylinders 14a, 14b, 14c may also be angularly offset from one another as described above with respect to the first pistons 16a.

It will be appreciated that as the first and second pistons 16a, 16b slide or otherwise move within the passage 26 between a bottom dead center position (not shown) and a top dead center position (FIG. 2), the size of the chamber 50 will vary between a fully compressed configuration and a fully expanded configuration. In this regard, each piston 16 may be supported by, or otherwise coupled to, a connecting rod 54. The connecting rod 54 can be supported by, or otherwise coupled to, a crankshaft (not shown). As the pistons 16 slide or otherwise translate within the passage 26 of the cylinder 14, the translational movement of the pistons 16 can be converted to the rotational movement of the crankshaft through the connecting rod 54.

The nozzle 22 can be disposed within, or otherwise extend through, the cylinder 14. As illustrated in FIG. 3A, in some configurations the cylinder 14 may include three nozzles 22 disposed within the cylinder 14 about the longitudinal axis A1, such that each nozzle 22 is offset from an adjacent nozzle 22 by an angle β about the longitudinal axis A1. Specifically, a first nozzle 22a may extend from the cylinder 14 along an axis Xa, a second nozzle 22b may extend from the cylinder along an axis Xb, and a third nozzle 22c may extend from the cylinder along an axis Xc. The axis Xa may be offset from the axis Xb by an angle βa, the axis Xb may be offset from the axis Xc by an angle βb, and the axis Xc may be offset from the axis Xa by an angle βc. In some configurations, the angle βa may be substantially equal to the angle βb, and the angle βb may be substantially equal to the angle βc, such that the nozzles 22a, 22b and 22c are symmetrically disposed about the longitudinal axis A1. In this regard, the first nozzle 22a may be disposed or otherwise aligned with a point of intersection of the first and second surfaces 36, 38 of the first piston 16a, the second nozzle 22b may be disposed or otherwise aligned with a point of intersection of the second and third surfaces 38, 40 of the first piston 16a, and the third nozzle 22c may be disposed or otherwise aligned with a point of intersection of the first and third surfaces 36, 40 of the first piston 16a. In one example, βa, βb, and βc may each be equal to an angle between 100 degrees and 140 degrees. In one particular example, βa, βb, and βc may each be equal to 120 degrees. It will also be appreciated that the angle βa may differ from the angle βb, and/or the angle βb may differ from the angle βc.

The nozzles 22 may be in fluid communication with the passage 26. In this regard, the nozzles 22 can be configured to spray or otherwise deliver a volume of fuel to the chamber 50 for combustion. In this regard, the nozzles 22 may be aligned relative to the longitudinal axis A1. In some configurations the nozzles 22a, 22b, 22c may deliver the volume of fuel in a direction substantially along or parallel to the axes Xa, Xb, Xc, respectively. In other configurations, the volume of fuel may be delivered in a direction that is offset from the axes Xa, Xb, Xc.

As illustrated in FIG. 3A, in the assembled configuration the cylinders 14 may be positioned within the engine 10 such that the longitudinal axes A1 are substantially parallel to each other. In addition, cylinders 14 may be positioned within the engine such that the nozzles 22 of the first cylinder 14a are aligned with the nozzles 22 of the second and/or third cylinders 14b, 14c relative to the longitudinal axes A1b, A1c, respectively. In this regard, the axes Xa, Xb, Xc of the nozzles 22 of one or more of the cylinders 14 may extend in, or otherwise define, a plane. In some configurations, all of the axes Xa, Xb, Xc of the nozzles 22 of the cylinders 14 may extend in, or otherwise define, a plane. In some configurations, the longitudinal axis A1a of the first cylinder 14a may also be offset from the longitudinal axis A1b of the second cylinder 14b that is adjacent to the first cylinder 14a. In this regard, the longitudinal axis A1b may be offset in a first direction from the longitudinal axis A1a by a distance Da. Similarly, the longitudinal axis A1c of the third cylinder 14c, that is adjacent to the second cylinder 14b, may be offset in a second direction from the longitudinal axis A1b by a distance Db. The second direction may be opposite the first direction. In some configurations, the distance Db may be substantially equal to the distance Da, such that the longitudinal axis A1c is aligned or otherwise coplanar with the longitudinal axis A1b. As discussed earlier, the engine 10 may include any number (N) of cylinders 14. In this regard, it will be appreciated that each cylinder 14(N) may be offset from an adjacent cylinder 14(N−1) by the distance Da, and offset from an adjacent cylinder 14(N+1) by the distance Db.

With continued reference to FIG. 3A, the nozzles 22a, 22b, 22c of the first cylinder 14a may also be angularly offset about the longitudinal axis A1a relative to the nozzles 22a, 22b, 22c, respectively, of the second cylinder 14b. Specifically, the first nozzle 22a of the second cylinder 14b may be angularly offset about the longitudinal axis A1b relative to the orientation of the first nozzle 22a of the first cylinder 14a about the longitudinal axis A1a. In this regard, the axis Xa of the first nozzle 22a of the first cylinder 14a may be substantially aligned with the transverse axis A2a of the first cylinder 14a, while the axis Xa of the first nozzle 22a of the second cylinder 14b may be offset from the transverse axis A2b of the second cylinder 14b by an angle θb. Similarly, the axis Xb of the second nozzle 22b of the first cylinder 14a may be offset from the transverse axis A2a of the first cylinder 14a by the angle βa, while the axis Xb of the second nozzle 22b of the second cylinder 14b may be substantially aligned with the transverse axis A2b of the second cylinder 14b. Similarly, still, the axis Xc of the third nozzle 22c of the first cylinder 14a may be offset from the transverse axis A2a of the first cylinder 14a by the angle βc, while the axis Xc of the third nozzle 22c of the second cylinder 14b may be offset from the transverse axis A2b of the second cylinder 14b by an angle θc. As previously discussed, the angles βa, βb, and βc may be substantially equal to each other. In addition, the axis Xa of the first nozzle 22a of the first cylinder 14a may be offset from the axis Xa of the first nozzle 22a of the second cylinder 14b by an angle between 45 and 75 degrees, and in some configurations, substantially equal to 60 degrees. Similarly, the axes Xb, Xc of the second and third nozzles 22b, 22c of the first cylinder 14a may be offset from the axes Xb, Xc, respectively, of the second and third nozzles 22b, 22c of the second cylinder 14b by an angle between 45 and 75 degrees, and in some configurations, substantially equal to 60 degrees.

The configuration of the cylinders 14, including the distances Da and Db, the configuration of the nozzles 22a, 22b, 22c, including the angles β and θ, and the configuration of the pistons 16a, 16b, can allow for the closest possible arrangement of the cylinders 14 within the engine 10 having three nozzles 22. Specifically, arranging the cylinders 14 and the nozzles 22a, 22b, 22c in the manner described can help to prevent the nozzles 22a, 22b, 22c from contacting or otherwise interfering with an adjacent cylinder 14 and/or the nozzles 22a, 22b, 22c of the adjacent cylinder 14, thus allowing for a reduction in the size of the engine 10. Moreover, the inclusion of three nozzles 22 within the engine 10 can help to ensure improved combustion performance, including efficient utilization and combustion of air within the chamber 50, as well as the efficient mixing of fuel from each of the nozzles 22 within the chamber 50.

Figure 3B:
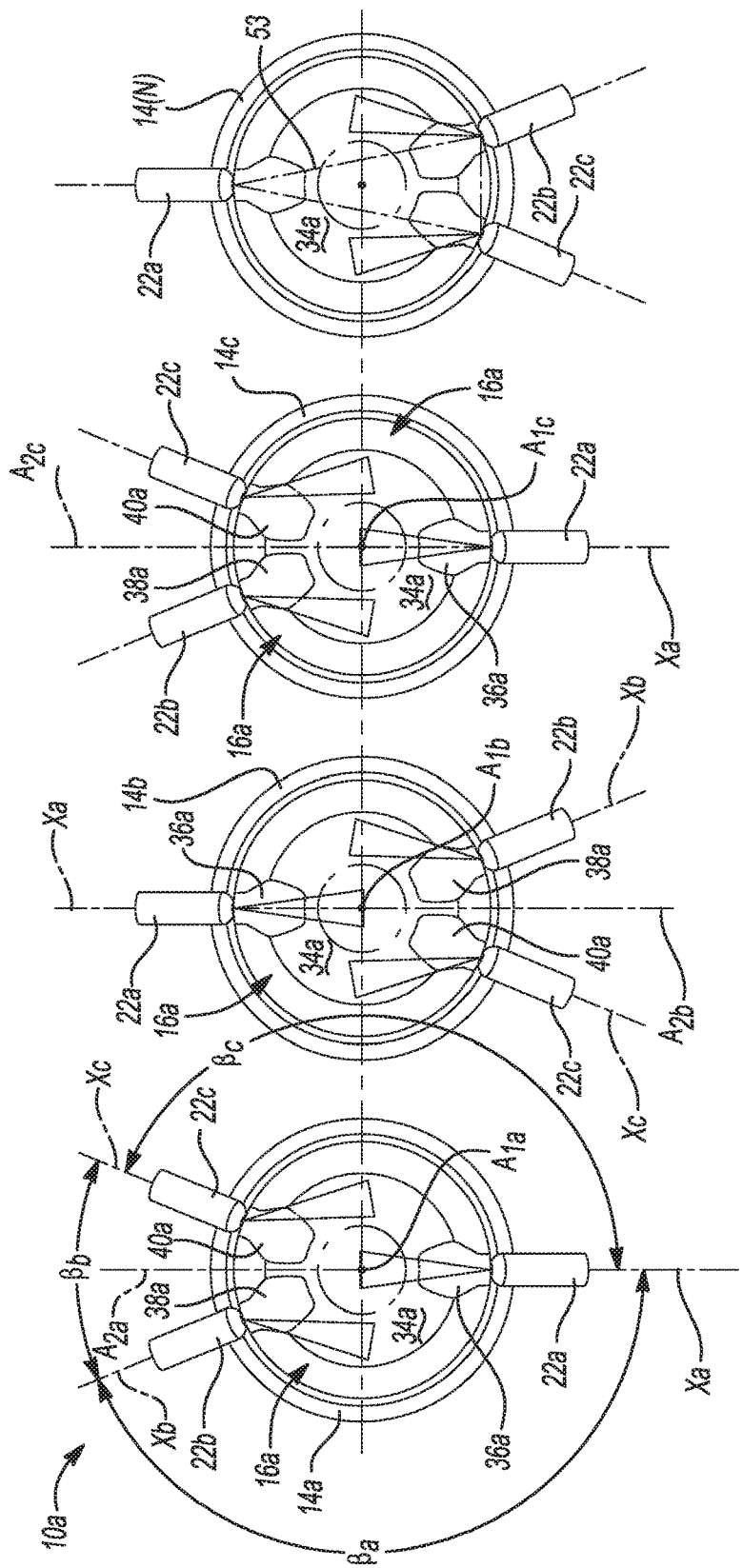
FIG. 3B is a cross-sectional view of another opposed piston engine in accordance with the principles of the present disclosure.

With reference to FIG. 3B, another example of an engine is labelled 10a. The engine 10a is substantially similar to the engine 10 such that only differences between the engines 10, 10a will now be described. In the engine 10 shown in FIG. 3A, the longitudinal axis A1b of the second cylinder 14b is offset in a first direction from the longitudinal axis A1a of the first cylinder 14a. In addition, the longitudinal axis A1c of the third cylinder 14c is offset in a second direction from the longitudinal axis A1b, where the second direction is opposite from the first direction. In contrast, in the engine 10a shown in FIG. 3B, the longitudinal axes A1a, A1b, A1c, of the first, second, and third cylinders 14a, 14b, and 14c are aligned with one another such that the longitudinal axes A1a, A1b, A1c all lie within the same plane.

Further, in the engine 10 shown in FIG. 3A, the angles βa, βb, and βc between the axes Xa, Xb, Xc of the nozzles 22a, 22b, 22c are each equal to 120 degrees. Thus, the nozzles 22a, 22b, 22c are symmetrically disposed about the longitudinal axes A1a, A1b, A1c of the first, second, and third cylinders 14a, 14b, and 14c. In contrast, in the engine 10a shown in FIG. 3B, the angle βa between the first and second nozzles 22a and 22b is less than the angle βb between the second and third nozzles 22a and 22b and less than the angle βc between the first and third nozzles 22a and 22c. In addition, the angles βb and βc are equal to each other such that the distal ends of the nozzles 22a, 22b, 22c form an isosceles triangle 53. In one example, the angle βa is between 60 degrees and 120 degrees (e.g., 70 degrees), and each of the angles βb and βc are between 150 degrees and 120 degrees (e.g., 145 degrees). In the preceding example, each of the angles βb and βc may be determined by subtracting the angle βa from 360 degrees and dividing the result by two.

Figure 4B:
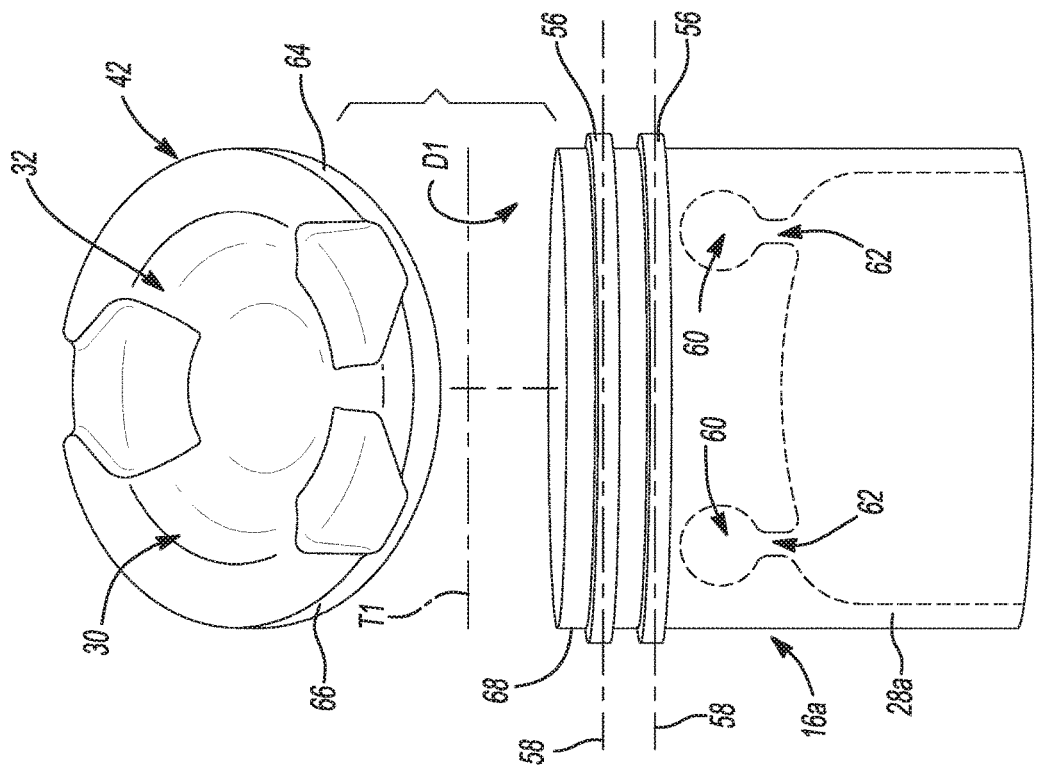
FIG. 4B is a side elevation view of another example piston of the opposed-piston engine of FIG. 1.
Figure 4A:
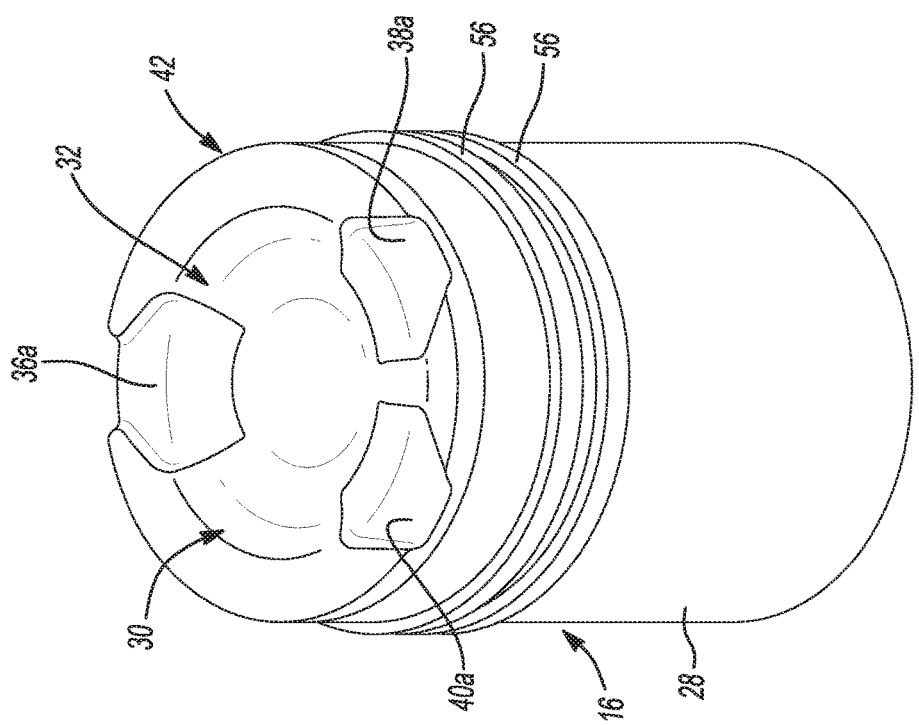
FIG. 4A is a side elevation view of an example piston of the opposed-piston engine of FIG. 1.

Further, with additional reference to FIG. 4A, the shape of the crown 30 of the pistons 16 in the engine 10a is different than the shape of the crown 30 of the pistons 16 in the engine 10. In the engine 10a, the first, second, and third side surfaces 36, 38, and 40 of the recess 32 are disposed adjacent to the first, second, and third nozzles 22a, 22b, and 22c, respectively. In addition, the first, second, and third side surfaces 36, 38, and 40 have elongated, concave shapes that are centered about the axis Xa, Xb, or Xc of a corresponding one of the first, second, and third nozzles 22a, 22b, and 22c. The shapes of the first, second, and third side surfaces 36, 38, and 40 accommodate the spray patterns of the first, second, and third nozzles 22a, 22b, and 22c, respectively. Further, the bottom surface 34 of the recess 32 has a hemispherical, concave shape that provides fluid communication between the elongated, concave shapes formed by the first, second, and third side surfaces 36, 38, and 40.

With reference to FIG. 4B, another example of one of the pistons 16 of the engine 10 or 10a is shown. As FIG. 4B illustrates, the crown 30 of the piston 16 may not be flat. For example, the recess 32 may be inset or depressed in the crown 30 of the piston 16 relative to the rim 42 of the piston 16. The piston 16 includes one or more piston rings 56 that extend annularly about the piston 16. Each of the piston rings 56 defines a ring plane 58, which may be transverse to the skirt 28. The piston rings 56 abut and seal against the cylinder 14 (see FIG. 1) to prevent the blow-by of combustion gases. Limiting the operational temperatures of the piston rings 56 to avoid ring failure is critical to the design of the engine 10. Overheating of the piston rings 56, and ultimately ring failure, can be caused by combustion related heat and/or heat generated by friction between the piston rings 56 and the cylinder 14.

In order to improve the service life of piston rings 56, the piston 16 may be provided with a cooling gallery 60 that functions to draw heat away from the piston rings 56. By way of example and without limitation, the cooling gallery 60 may have an annular shape and may be disposed within the piston 16 inwardly of the crown 30. The cooling gallery 60 is hollow and may include openings 62 that allow oil within passage 26 (see FIG. 1) to enter and exit the cooling gallery 60 in order to carry heat away from the crown 30. Thus, improved thermal management (i.e. cooling) of the piston 16 may be achieved.

In addition to or as an alternative to the cooling gallery 60, the piston 16 may be coated with a ceramic material 64 for improved heat resistance. The piston 16 itself may be made of a variety of different materials. By way of example and without limitation, the piston 16 may be made of a steel alloy, an aluminum alloy, or cast iron. These materials are generally good thermal conductors such that the heat experienced by the crown 30 is transferred through the piston 16 and to the piston rings 56. The ceramic material 64 coating the piston 16 reduces heat transfer between hot combustion gases in the chamber 50 (see FIG. 2) and the crown 30 of the piston 16 and therefore reduces the amount of heat that is transferred from the piston 16 to the piston rings 56. In other words, the ceramic material 64 coating the piston 16 helps insulate the piston 16 from hot combustion gases and therefore reduces the temperature of the piston 16. Because the piston 16 is kept at a lower temperature as a result of the ceramic material 64, the amount of heat that is transferred from the piston 16 to the piston rings 56 is reduced. This ultimately lowers the operating temperature of the piston rings 56. The ceramic material 64 coating the piston 16 may be applied using known manufacturing techniques.

As another alternative, a thermal cap 66 of the crown 30 may be formed separate from a base 68 of the crown 30 and secured to or retained on the base 68. The thermal cap 66 can be made of the ceramic material, and the base 68 can be made of a metal material. In FIG. 4B, the thermal cap 66 is shown separated from the base 68 and slightly tilted with respect to the base 68 in a direction D1 about a transverse axis T1.

The thermal cap 66 may be retained on the base 68 in a variety of different ways. By way of example and without limitation, the thermal cap 66 may be retained on the base 68 by a mechanical connection, friction welding, thermal welding, or by an adhesive. The thermal cap 66 defines the top surface of the crown 30 of the piston 16 shown in FIG. 4B. Advantageously, the thermal cap 66 helps insulate the piston 16 from hot combustion gases within the chamber 50. Again, this decreases operational temperatures at the piston rings 56, which leads to improved piston ring function and increased service life.

As with the ceramic material 64 coating the piston 16, the thermal cap 66 may be used in place of or in addition to the cooling gallery 60. In configurations where the cooling gallery 60 is replaced by the ceramic material 64 coating the piston 16 or the thermal cap 66, the strength of the piston 16 is not compromised because the hollow cooling gallery 60 and the associated stress risers that the cooling gallery 60 creates in the piston 16 are eliminated. Accordingly, the piston 16 is more resistant to deflection caused by operational forces, including forces resulting from combustion, friction, inertia, and thermal expansion of the piston 16, the piston rings 16, and/or the cylinder 14. Additionally, because the hollow cooling gallery 60 may be eliminated, the piston 16 may be made without complex machining operations, reducing manufacturing time and costs.

Various features of the different examples of the pistons 16 described herein may be interchangeable. For example, the example piston 16 shown in FIG. 4A includes the piston rings 56 described with reference to the example piston 16 shown in FIG. 4B. Conversely, the example piston 16 shown in FIGS. 1, 2, and 3A may incorporate various features described with reference to the example piston 16 shown in FIG. 4B. For example, the example piston 16 shown in FIGS. 1, 2, and 3A may be provided with the cooling gallery 60, may be coated with the ceramic material 64, and/or may include the thermal cap 66 formed separate from and joined to the base 68.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. An opposed piston engine, comprising:
a first housing defining a first passage extending along a first longitudinal axis; and
first, second, and third fuel injector nozzles having first, second, and third nozzle axes, respectively, that are disposed in a common plane that is perpendicular to the first longitudinal axis, wherein:
the first, second, and third nozzle axes intersect the first longitudinal axis;
at least one of the first, second, and third nozzle axes is angularly offset relative to another one of the first, second, and third nozzle axes by an oblique angle about the first longitudinal axis; and
the first, second, and third fuel injector nozzles are in fluid communication with the first passage.

2. An opposed piston engine, comprising:
a first housing defining a first passage extending along a first longitudinal axis;
first, second, and third fuel injector nozzles having first, second, and third nozzle axes, respectively, that are disposed in a common plane that is perpendicular to the first longitudinal axis;
a second housing defining a second passage extending along a second longitudinal axis substantially parallel to the first longitudinal axis; and
fourth, fifth, and sixth fuel injector nozzles having fourth, fifth, and sixth nozzle axes, respectively, that are disposed in a second common plane that is perpendicular to the second longitudinal axis, wherein:
at least one of the first, second, and third nozzle axes is angularly offset relative to another one of the first, second, and third nozzle axes by an oblique angle about the first longitudinal axis;
the first, second, and third fuel injector nozzles are in fluid communication with the first passage;
at least one of the fourth, fifth, and sixth nozzle axes is angularly offset relative to another one of the fourth, fifth, and sixth nozzle axes by an oblique angle about the second longitudinal axis;
the fourth, fifth, and sixth fuel injector nozzles are in fluid communication with the second passage; and
the orientation of the fourth fuel injector nozzle about the second longitudinal axis is angularly aligned with the orientation of the first fuel injector nozzle about the first longitudinal axis.

3. The opposed piston engine of claim 2, further comprising:
a third housing defining a third passage extending along a third longitudinal axis substantially parallel to the first and second longitudinal axes, the third housing disposed between the first and second housings; and seventh, eighth, and ninth fuel injector nozzles circumferentially disposed about the third longitudinal axis and in fluid communication with the third passage, the orientation of the seventh fuel injector nozzle about the third longitudinal axis being angularly offset by a first angle relative to the orientation of the first fuel injector nozzle about the first longitudinal axis and relative to the orientation of the fourth fuel injector nozzle about the second longitudinal axis.

4. The opposed piston engine of claim 3, wherein the third longitudinal axis is offset from the first and second longitudinal axes by a distance extending in a direction substantially perpendicular to the first and second longitudinal axis.

5. The opposed piston engine of claim 4, wherein the first and third longitudinal axes define a third common plane.

6. The opposed piston engine of claim 2, wherein the first, second, and third nozzle axes are symmetrically disposed about the first longitudinal axis.

7. The opposed piston engine of claim 2 wherein:
the first nozzle axis is angularly offset relative to the second nozzle axis by a first angle about the first longitudinal axis;
the second nozzle axis is angularly offset relative to the third nozzle axis by a second angle about the first longitudinal axis;
the third nozzle axis is angularly offset relative to the first nozzle axis by a third angle about the first longitudinal axis; and
the first and third angles are equal to one another and are greater than the second angle.

8. An opposed piston engine, comprising:
a first housing defining a first passage extending along a first longitudinal axis;
a first pair of pistons slidably disposed within the first passage;
first, second, and third fuel injector nozzles circumferentially disposed about the first longitudinal axis and in fluid communication with the first passage;
a second housing defining a second passage extending along a second longitudinal axis substantially parallel to the first longitudinal axis;
a second pair of pistons slidably disposed within the second passage; and
fourth, fifth, and sixth fuel injector nozzles circumferentially disposed about the second longitudinal axis and in fluid communication with the second passage,
wherein the orientation of the fourth fuel injector nozzle about the second longitudinal axis is angularly offset relative to the orientation of the first fuel injector nozzle about the first longitudinal axis, and
wherein the orientation of the fifth fuel injector nozzle about the second longitudinal axis is angularly offset relative to the orientation of the second fuel injector nozzle about the first longitudinal axis.

9. The opposed piston engine of claim 8, wherein the second longitudinal axis is offset from the first longitudinal axis by a first distance extending in a first direction substantially perpendicular to the first longitudinal axis.

10. The opposed piston engine of claim 9, further comprising a third housing defining a third passage extending along a third longitudinal axis, the third longitudinal axis substantially parallel to the first and second longitudinal axes, the third longitudinal axis offset from the second longitudinal axis by a second distance extending in a second direction substantially perpendicular to the second longitudinal axis.

11. The opposed piston engine of claim 10, wherein the first and third longitudinal axes define a first plane.

12. The opposed piston engine of claim 11, further comprising a fourth housing defining a fourth passage extending along a fourth longitudinal axis, the fourth longitudinal axis substantially parallel to the first, second, and third longitudinal axes, the fourth longitudinal axis offset from the third longitudinal axis by a third distance extending in a third direction substantially perpendicular to the third longitudinal axis.

13. The opposed piston engine of claim 12, wherein the second and fourth longitudinal axes define a second plane.

14. The opposed piston engine of claim 8 wherein:
the first, second, and third fuel injector nozzles are disposed within a common plane that is perpendicular to the first longitudinal axis; and
the fourth, fifth, and sixth fuel injector nozzles are disposed within a common plane that is perpendicular to the second longitudinal axis.

15. The opposed piston engine of claim 8 wherein:
the first, second, and third fuel injector nozzles are symmetrically disposed about the first longitudinal axis; and
the fourth, fifth, and sixth fuel injector nozzles are symmetrically disposed about the second longitudinal axis.

16. The opposed piston engine of claim 8 wherein:
the first fuel injector nozzle is angularly offset relative to the second fuel injector nozzle by a first angle about the first longitudinal axis;
the second fuel injector nozzle is angularly offset relative to the third fuel injector nozzle by a second angle about the first longitudinal axis;
the third fuel injector nozzle is angularly offset relative to the first fuel injector nozzle by a third angle about the first longitudinal axis;
the fourth fuel injector nozzle is angularly offset relative to the fifth fuel injector nozzle by the first angle about the second longitudinal axis;
the fifth fuel injector nozzle is angularly offset relative to the sixth fuel injector nozzle by the second angle about the second longitudinal axis;
the sixth fuel injector nozzle is angularly offset relative to the fourth fuel injector nozzle by the third angle about the second longitudinal axis; and
the first and third angles are equal to one another and are greater than the second angle.

17. An opposed piston engine, comprising:
a first housing defining a first passage extending along a first longitudinal axis;
first, second, and third fuel injector nozzles circumferentially disposed about the first longitudinal axis and in fluid communication with the first passage;
a second housing defining a second passage extending along a second longitudinal axis substantially parallel to the first longitudinal axis; and
fourth, fifth, and sixth fuel injector nozzles circumferentially disposed about the second longitudinal axis and in fluid communication with the second passage, the orientation of the fourth fuel injector nozzle about the second longitudinal axis being angularly offset relative to the orientation of the first fuel injector nozzle about the first longitudinal axis.

18. The opposed piston engine of claim 17, wherein the orientation of the fourth fuel injector nozzle about the second longitudinal axis is angularly offset relative to the orientation of the first fuel injector nozzle about the first longitudinal axis by an angle that is between 45 degrees and 75 degrees.

19. The opposed piston engine of claim 17, wherein the orientation of the fourth fuel injector nozzle about the second longitudinal axis is angularly offset relative to the orientation of the first fuel injector nozzle about the first longitudinal axis by an angle that is substantially equal to 60 degrees.

20. The opposed piston engine of claim 17, wherein the second longitudinal axis is offset from the first longitudinal axis by a distance extending in a direction substantially perpendicular to the first longitudinal axis.

21. The opposed piston engine of claim 20, further comprising a third housing defining a third passage extending along a third longitudinal axis, the third longitudinal axis substantially parallel to the first and second longitudinal axes, the third longitudinal axis offset from the second longitudinal axis by a distance extending in a direction substantially perpendicular to the second longitudinal axis.

22. The opposed piston engine of claim 21, wherein the first and third longitudinal axes define a first plane.

23. The opposed piston engine of claim 17, further comprising:
a pair of first and second pistons slidably disposed within the first passage of the first housing, the pair of first and second pistons each having a crown and a skirt that are at least partially made of metal.

24. The opposed piston engine of claim 23, wherein each piston of the pair of first and second pistons is coated with a ceramic material.

25. The opposed piston engine of claim 23, wherein each piston of the pair of first and second pistons includes a thermal cap that is made of a ceramic material and that defines the crown.

26. The opposed piston engine of claim 17 wherein:
the first, second, and third fuel injector nozzles are symmetrically disposed about the first longitudinal axis; and
the fourth, fifth, and sixth fuel injector nozzles are symmetrically disposed about the second longitudinal axis.

27. The opposed piston engine of claim 17 wherein:
the first fuel injector nozzle is angularly offset relative to the second fuel injector nozzle by a first angle about the first longitudinal axis;
the second fuel injector nozzle is angularly offset relative to the third fuel injector nozzle by a second angle about the first longitudinal axis;
the third fuel injector nozzle is angularly offset relative to the first fuel injector nozzle by a third angle about the first longitudinal axis;
the fourth fuel injector nozzle is angularly offset relative to the fifth fuel injector nozzle by the first angle about the second longitudinal axis;
the fifth fuel injector nozzle is angularly offset relative to the sixth fuel injector nozzle by the second angle about the second longitudinal axis;
the sixth fuel injector nozzle is angularly offset relative to the fourth fuel injector nozzle by the third angle about the second longitudinal axis; and
the first and third angles are equal to one another and are greater than the second angle.

* * * * *